(12) United States Patent
Udvardy et al.

(10) Patent No.: US 9,753,631 B2
(45) Date of Patent: Sep. 5, 2017

(54) NAVIGATION WITH SLIDES IN A ZOOMING USER INTERFACE

(71) Applicant: Prezi, Inc., San Francisco, CA (US)

(72) Inventors: David Udvardy, Budapest (HU); László Laufer, Budapest (HU); Laszlo Pandy, San Francisco, CA (US); Ákos Tóth-Máté, Godollo (HU); Peter Neumark, San Francisco, CA (US); Daniel Falus, San Francisco, CA (US); Vera Gergely, San Francisco, CA (US); Ádám Somlai-Fisher, Budapest (HU); Peter Arvai, San Francisco, CA (US); Andrei Boghiu, Budapest (HU)

(73) Assignee: Prezi, Inc., San Francisco, CA (US)

( * ) Notice: Subject to any disclaimer, the term of this patent is extended or adjusted under 35 U.S.C. 154(b) by 294 days.

(21) Appl. No.: 14/051,303

(22) Filed: Oct. 10, 2013

(65) Prior Publication Data

US 2014/0101605 A1    Apr. 10, 2014

Related U.S. Application Data

(60) Provisional application No. 61/712,128, filed on Oct. 10, 2012.

(51) Int. Cl.
*G06F 3/0485* (2013.01)
*G06F 3/0481* (2013.01)

(52) U.S. Cl.
CPC ........ *G06F 3/0485* (2013.01); *G06F 3/04817* (2013.01); *G06F 2203/04806* (2013.01)

(58) Field of Classification Search
CPC ......... G06F 3/0481; G06F 2203/04806; G06F 3/04817
USPC ................................ 715/732, 730, 815, 716
See application file for complete search history.

(56) References Cited

U.S. PATENT DOCUMENTS 7,707,503 B2 *    4/2010   Good et al. ................... 715/732
2009/0265632 A1 *  10/2009   Russ et al. .................... 715/716

* cited by examiner

*Primary Examiner* — Kevin Nguyen
(74) *Attorney, Agent, or Firm* — Schwegman Lundberg & Woessner, P.A.

(57) ABSTRACT

A method is provided method to control a computer generated presentation using a two-dimensional (2D) zooming user interface, the method comprising: providing on the display screen multiple respective thumbnail images that correspond to the multiple screen images displayed within the presentation; and in response to receipt of user input selecting one thumbnail image followed by receipt of user input selecting another of the thumbnail image, displaying on the display screen a screen image that corresponds to the user selected one thumbnail image followed by display on the display screen of another thumbnail image that corresponds to the user selected another thumbnail image and display of at least one of panning and zooming between display of the one thumbnail image and the another thumbnail image.

28 Claims, 18 Drawing Sheets

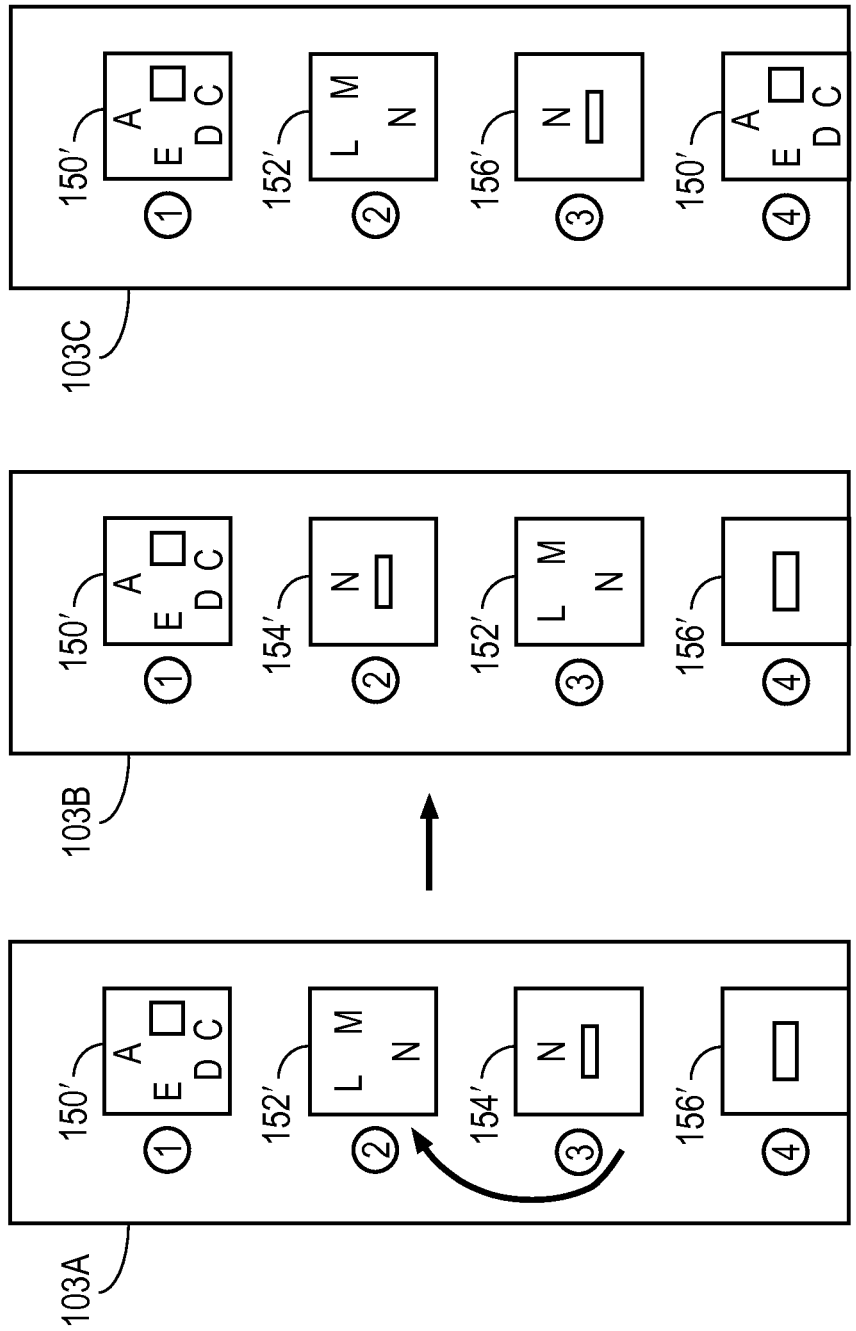

NAVIGATION WITH SLIDES IN A ZOOMING USER INTERFACE

CROSS-REFERENCE TO RELATED APPLICATION(S)

The present application claims the benefit of priority under 35 U.S.C. §119(e) to U.S. Provisional Patent Application No. 61/712,128, filed Oct. 10, 2012, which is hereby incorporated by reference in its entirety.

BACKGROUND

A zooming user interface (ZUI) is a type of graphical user interface (GUI) in which the scale of a viewed area is changed in order to view more detail or less, and to browse through and among different visual display elements such as images, shapes, documents, or videos. Display elements may be added to a workspace referred to as a 'canvas' to create a zoomable presentation in which details and subtopics can be presented through zooming in and out to reveal more or less detail. The canvas is larger than a viewing window generated on a device display screen, and a user can scroll a viewing window to view different display elements The ZUI differs from a normal canvas in that the user may zoom in or out onto a particular display element. Display elements can be inserted anywhere among the presentation content, in addition to grouping display elements within frames. Users can pan across the canvas in two dimensions and zoom into objects of interest. Display elements present inside a zoomed region can in turn be zoomed themselves to reveal additional detail, allowing for recursive nesting and an arbitrary level of zoom. For example, as a user zooms into a text object, the text may be represented initially as a small dot, then as a thumbnail image, next as a complete page and finally as a magnified view of a portion of the page focused on a key passage from the text. Thus, ZUIs use zooming as the primary metaphor for browsing through multivariate or hyperlinked information. Display elements present inside a zoomed region can in turn be zoomed themselves to reveal additional detail, allowing for recursive nesting and an arbitrary level of zoom.

FIG. 1A-1C are an illustrative drawings showing display elements viewed through a viewing window disposed on a canvas at three different zoom levels. FIG. 1A shows a viewing window 2 through which portions of display elements 4 and 6 are visible but in which display elements 8-14 are not visible. The four arrows in FIG. 1A indicate the ability to move the viewing window so as to pan across the canvas. FIG. 1B shows a zoomed out view of the same canvas in which display elements 4-14 are visible through the viewing window 2. FIG. 1C shows a zoomed in view of display element 6 on the same canvas through the viewing window 2.

BRIEF DESCRIPTION OF THE DRAWINGS

FIGS. 7A-7C are illustrative drawings showing functional relationship between changing ordering of thumbnail slide images in the control panel region (FIG. 7A) and display of arcs during editing (FIG. 7B) that indicate the order of presentation of display elements as screen images later during a presentation and actual screen images displayed (FIG. 7C) during a presentation following the change in thumbnail slide ordering in accordance with some embodiments.

DESCRIPTION OF EMBODIMENTS

Figure 1A:
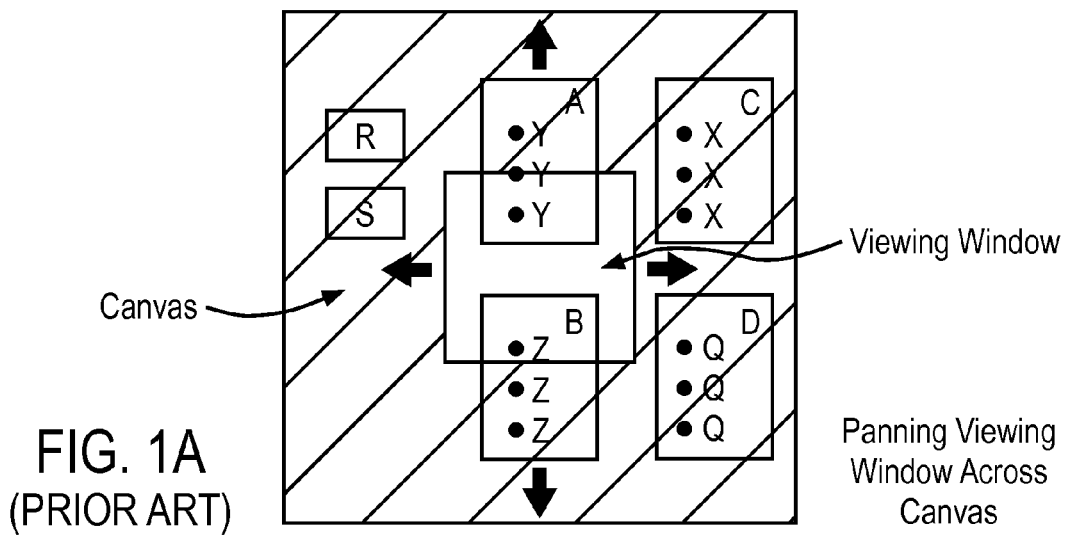
FIG. 1A-1C are an illustrative drawings showing display elements viewed through a viewing window disposed on a canvas at three different zoom levels.
Figure 1B:
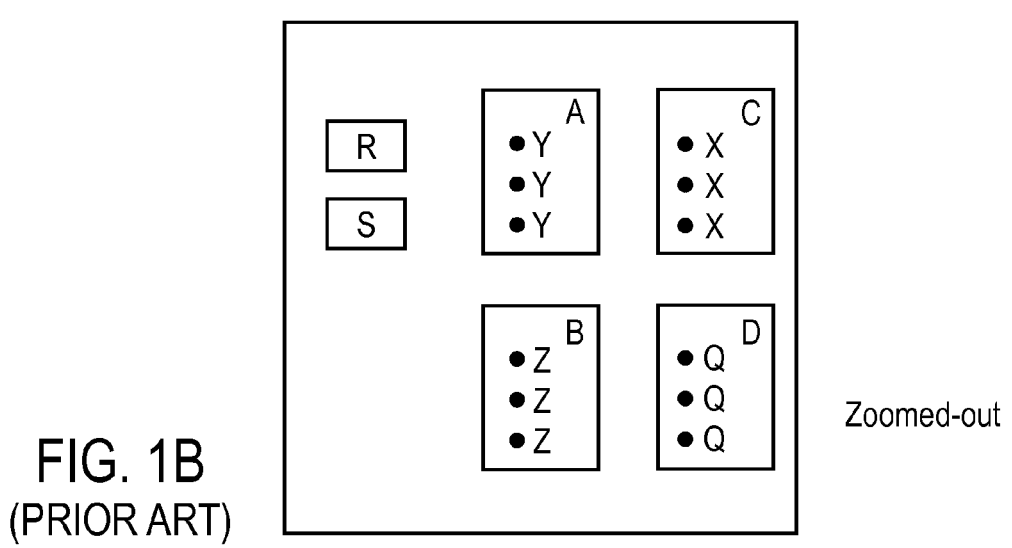
Figure 1C:
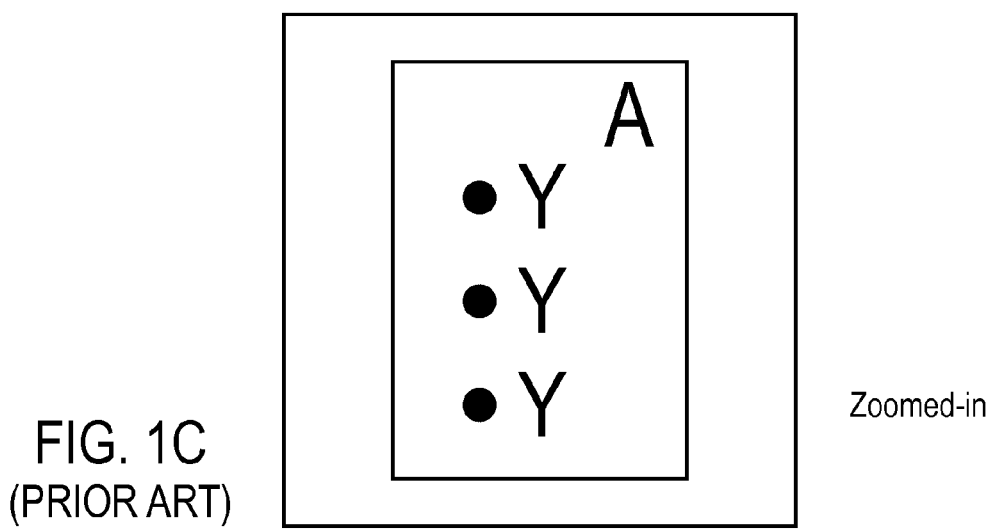
Figure 2:
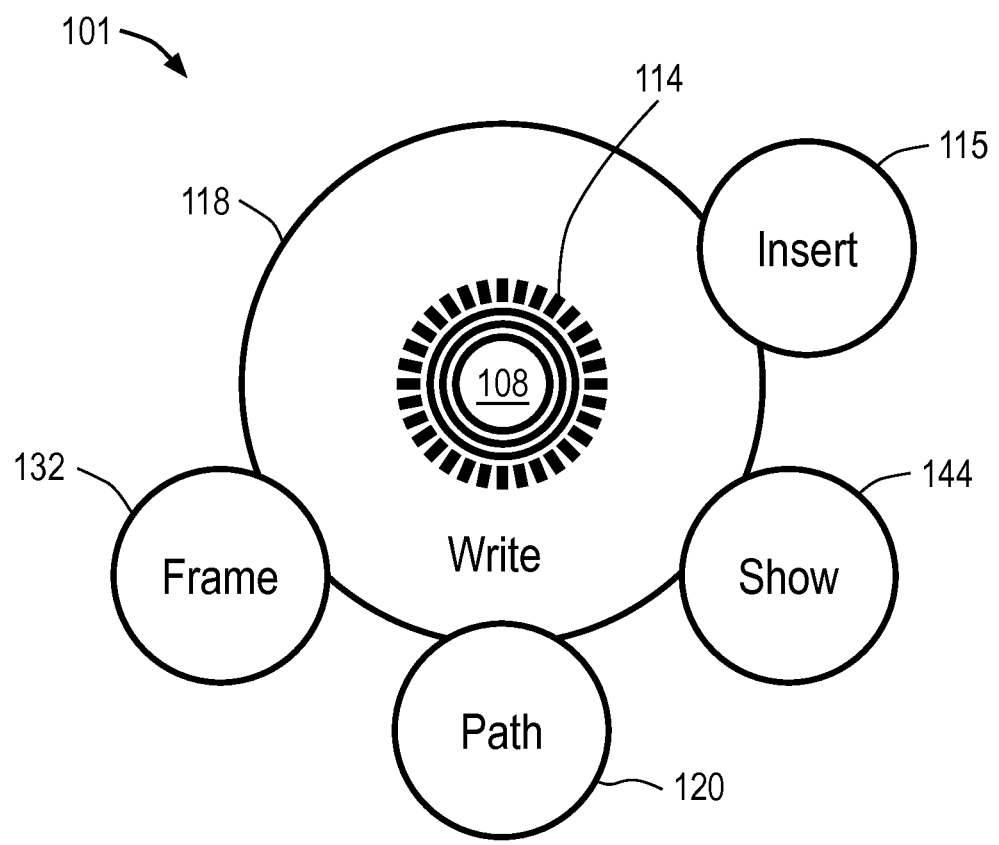
FIG. 2 is an illustrative drawing of a multi-function editing control element displayed on a display screen in accordance with some embodiments.

Referring now to FIG. 2 there is shown an illustrative drawing of a multi-function editing control element 101 displayed on a display screen in accordance with some embodiments. The control element 101 includes multiple control regions that a user can use to select, actuate invoke different transformations of a display element upon which it is superimposed. In operation, the editing control element 101 is displayed superimposed over the display element with which it is currently associated. The control element 101 can be made to disappear from view so as not to be a distraction, once a transformation of a display element is completed. In some embodiments, the editing control element is called a 'zebra'. A user can move the control element 101 to a position overlaying a display element and then click and hold the first region 108 of the control element 101 and then drag the overlaid display element to transform the location on the canvas 102 of the display element. A user can select a region 120 of the control element 101 to create a path between the display elements on a canvas 102 to create a presentation story line.

Figure 3:
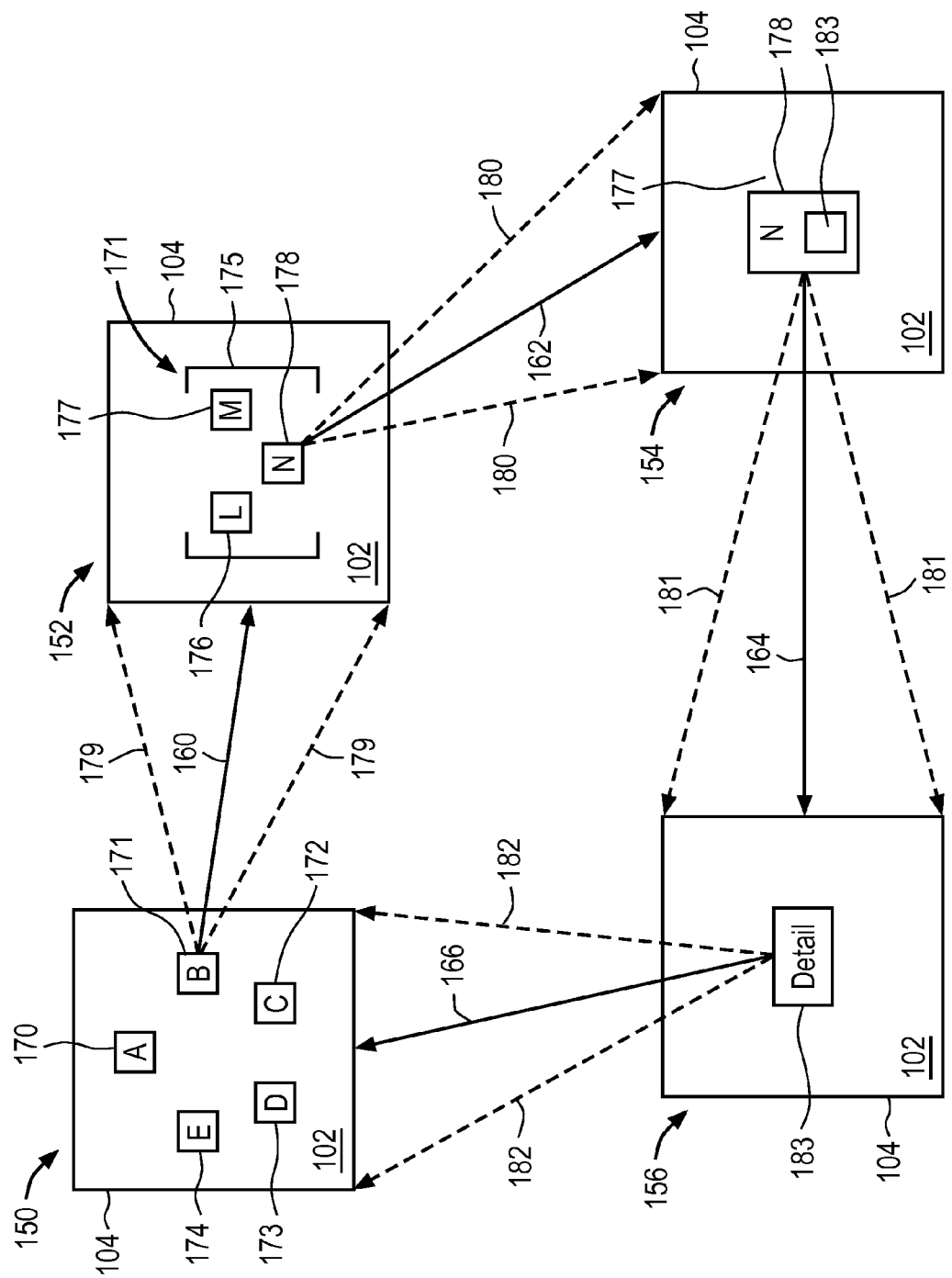
FIG. 3 shows an illustrative sequence of images produced on a display screen during an example presentation in accordance with some embodiments.

FIG. 3 shows an illustrative sequence of images produced on a display screen 104 during an example presentation in accordance with some embodiments. A computer is configured using program code to generate the presentation on the display screen 104. A presentation a screen displays on a display device that involve use of a zooming user interface and that typically involves panning across a canvas and zooming in to and/or zooming out from the canvas to focus upon a sequence of screen images disposed at different (x,y) locations on the canvas. Screen images may be nested within other screen images and the zooming brings into proper focus, in sequence, the larger or smaller screen images, for example. Ordinarily, a presentation pauses briefly at each screen image before moving to the next screen image. In other words, when a presentation is shown, it proceeds with relatively continuous panning and zooming motions from one screen image to the next where the panning and zooming momentarily pauses and a fixed screen image is displayed for some prescribed selectable time period, such as 5 or 10 seconds, for example. The pause time generally is selectable, and in some embodiments a user can manually control the duration of the pause. The panning or zooming motion across the canvas is during a presentation advantageously allows a user can perceive physical relationships among images on the canvas. Those physical relationships can be organized to connote relationships among content representing ideas such as a theme or a 'big picture idea' and the related 'detailed ideas', for example. Thus, showing the panning and zooming during a presentation can be used to connote conceptual relationships among content and ideas expressed in different screen images.

A presentation created using the ZUI environment is encoded in computer readable code stored in a computer readable storage device and can be used to configure a computer system to show the presentation on a display screen. An editing process to create a presentation involves adding a plurality of display elements to a canvas and defining attributes for individual display elements or groups of display elements such as their size, orientation, location, zoom level and order of order of presentation. As used herein, the term 'display element' refers to a computer generated image that is displayed on a portion of a canvas visible on a display screen in the course of a zooming presentation and that, therefore, constitutes a part of the presentation. A display element may include text, image, graphics, shapes, video, animation, hypertext link, other (nested) display elements or other visual components, for example. As used herein the term 'canvas' refers to an abstract space with its own coordinate system on which visual content is presented. The coordinate system of a 2D (two dimensional) canvas comprises two (2) dimensions, and display elements are displayed at (x,y) coordinate locations designated by a user during an editing mode of operation. Sometimes the coordinate system is referred having 2.5 dimensions due to zooming capability. At any given time, only a portion of the canvas is visible. A user may view portions of a canvas through a viewing window. As used herein 'window' means a boundary about that portion of the canvas that currently is visible in a screen display. While viewing the canvas through a viewing window, users can pan across the canvas in two dimensions and zoom into objects of interest. In other words, a user can move the viewing window in (x,y) directions to display different regions of the canvas and can cause the generated display to zoom in on details of the canvas image within the window or zoom out from details of the canvas image within the window. The use of a canvas and a viewing window allows for non-linear presentations, the option to present richer detail of content, and to give a better overview and understanding of complex visual messages and relations. For example, as a user zooms into a text object it may be represented as a small dot, then a thumbnail slide image of a page of text, then a full-sized page and finally a magnified view of the page.

Referring again to FIG. 3, the example presentation includes a sequence of screen images 150-156 showing display elements produced on the display screen 104. Each screen image, i.e., the computer generated image on a device display screen, shows that portion of the canvas that currently visible within the viewing window. From a user's perspective, the screen display is the viewing window. Collectively, the sequence of screen images 150-156 constitute a show or presentation in which a first screen image 150 is first presented followed by a second screen image 152, followed by a third screen image 154 followed by a fourth screen image 156, followed again by the first screen image 150. The example presentation involves zooming, which is illustrated using path segments that indicate zooming transitions from one screen display to the next. The direction of the show follows a sequence of path segments 160-166 in which the first three path segments 160-164 involve transitions to successively more zoomed-in views of display elements on the canvas 102 and in which the fourth path segment 166 involves a transition to a more zoomed-out view of the canvas 102. It will be appreciated that path segments represent computer code data structures encoded in a storage device that indicate the order of transitions among views in the presentation shown on the display screen 104, but they are not visible in the actual presentation.

The example presentation generates the first screen image 150 in which display element 169 and display elements 170-174, which are included within display element 169, are visible. As indicated by dashed lines 179, the presentation next presents the second screen image 152. It will be noted that in this example that as the presentation transitions from screen image 150 to screen image 152 it zooms in on display element 171 which becomes the second screen image 152. In other words, during one of the pauses in the presentation, the display element 171 encompasses the entire viewing window, and therefore, acts as a screen image during that pause. It will be appreciated that between pauses during a presentation, as the viewing window pans and/or zooms, different intermediate regions of the canvas are displayed between screen images as the window moves in a continuous motion from one screen image to the next.

Thus, the second screen image 152 is a zoomed in view of the display element 171, which in this example, is associated with a frame 175 (which may not be visible during the presentation) that groups together additional display elements 176-178. In some embodiments, a frame structure such as frame 175 acts as a point of focus for zooming during the presentation. Commonly owned U.S. patent application Ser. No. 13/298,523 filed Nov. 17, 2011, describes frame structures in accordance with some embodiments. A frame structure is used in some embodiments to control display elements as a unit that are grouped within the frame structure. Controlling display elements as a unit that are grouped within a frame structure includes translating (i.e. moving across the space), zooming, rotating and/or displaying all of the grouped display elements in unison, for example. Grouping with frames forms no part of the present invention, however, and will not be described further herein.

As indicated by dashed lines 180, the presentation next presents the third screen image 154 that zooms in to focus on display element 178. The zoomed in view of display element 178 includes detail region 183 that was too small to be visible in first screen image 150. As indicated by dashed lines 181, the presentation next presents the fourth screen image 156 that zooms in to focus in to and to show more detail and/or increased size of the region 183 of display element 178. The zoomed in view of display element 183 in the fourth screen image 154 shows details that were too small to be visible in third screen image 154. As indicated by dashed lines 182, the presentation next zooms out to focus again on the first screen image 150. Thus, the illustrative presentation viewing window zooms in on the canvas 102 as the presentation moves from screen images 150 to 154 to focus on progressively smaller size details of selected display elements and then zooms back out again from the canvas as the presentation moves from the fourth screen image 156 back to the first screen image 150.

Figure 4:
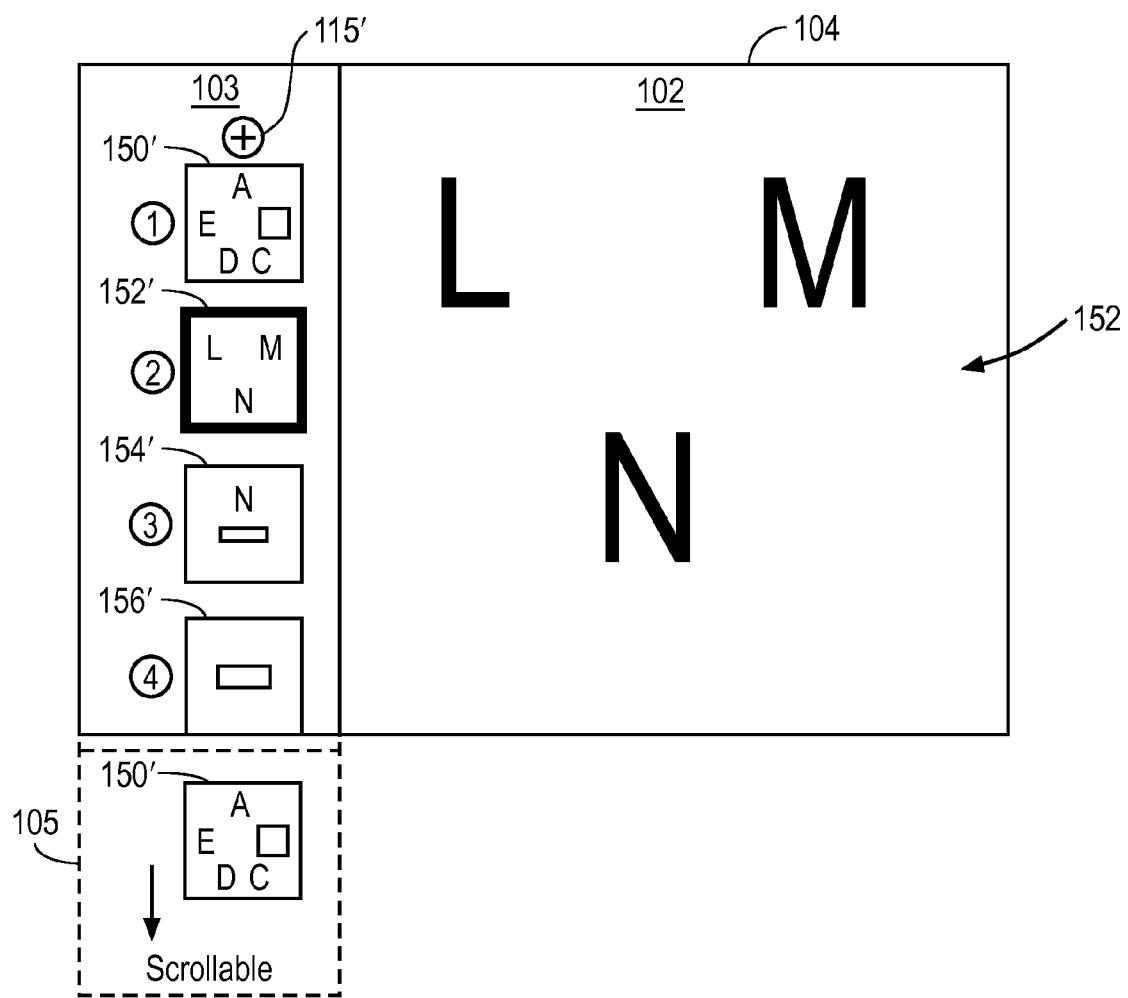
FIG. 4 is an illustrative drawing representing a display screen displaying a computer generated user interface that includes a zoomable canvas region and a control panel region in accordance with some embodiments.

FIG. 4 is an illustrative drawing representing a display screen 104 displaying a computer generated user interface 100 that includes a zoomable canvas region 102 in which a presentation can be displayed and that includes a control panel region 103 in which thumbnail slide images are shown of screen images shown on the canvas during the presentation in accordance with some embodiments. A thumbnail image includes a reduced size representation of an image. In the illustrative drawing of FIG. 4, the example second screen image 152 is shown on the canvas 102. The control panel region 103 includes first through fourth thumbnail images 150'-156', which correspond to screen images 105-154. The display of thumbnail image 152' in the control panel 103 is highlighted to indicate its correspondence with the screen image currently displayed on the canvas. The thumbnail images are ordered in the control panel 103 according to the order in which their corresponding screen images are shown in the presentation. Numbers (1, 2, . . . , N) adjacent thumbnail slides in the control panel 103 indicate the presentation order in which corresponding screen images are shown in the presentation show. The control region 103 is scrollable. Dashed lines 105 encompass another occurrence of thumbnail slide 150', which is not currently displayed within the control panel 103, but which can be made visible within the control panel 103 through scrolling. It will be appreciated, as explained more fully below, that a presentation may include numerous screen images and that scrolling through the thumbnail slide images can be used to navigate among screen images in the presentation.

Table 1 represents data structure information stored in a computer readable storage device corresponding to the example thumbnail image slides displayed within the control region 103 shown in FIG. 4 in accordance with some embodiments. The (x, y) locations represent 2D locations in the canvas. The zoom level indicates how much 2D space is visible in a screen image and the level of detail that can be discerned. In this example, a lower zoom level, e.g., 2, indicates less zoomed in, which means that a greater area of the canvas is visible but at a lower level of detail or resolution. Conversely, a higher zoom level, e.g., 9, indicates more zoomed in, which means that a greater area of the canvas is visible but at a higher level of detail or resolution. It will be appreciated that the numeric zoom levels in the table are examples selected for illustrative purposes. Moreover, it will be appreciated that an information structure in machine storage corresponding to Table 1 may include references to actual position and zoom levels, which may be associated with the presentation that the thumbnail images correspond to.

TABLE 1

| Order Number | (x, y,) position | Zoom level |
| --- | --- | --- |
| 1 | $(x_1, y_1,)$ | 2 |
| 2 | $(x_2, y_2,)$ | 4 |
| 3 | $(x_3, y_3,)$ | 6 |
| 4 | $(x_4, y_4,)$ | 9 |
| 5 | $(x_1, y_1,)$ | 2 |

Thus, the thumbnail image slides within the control panel allow a user to specify the image to display that is at a particular 2D (x, y) canvas location and zoom level.

Figure 14:
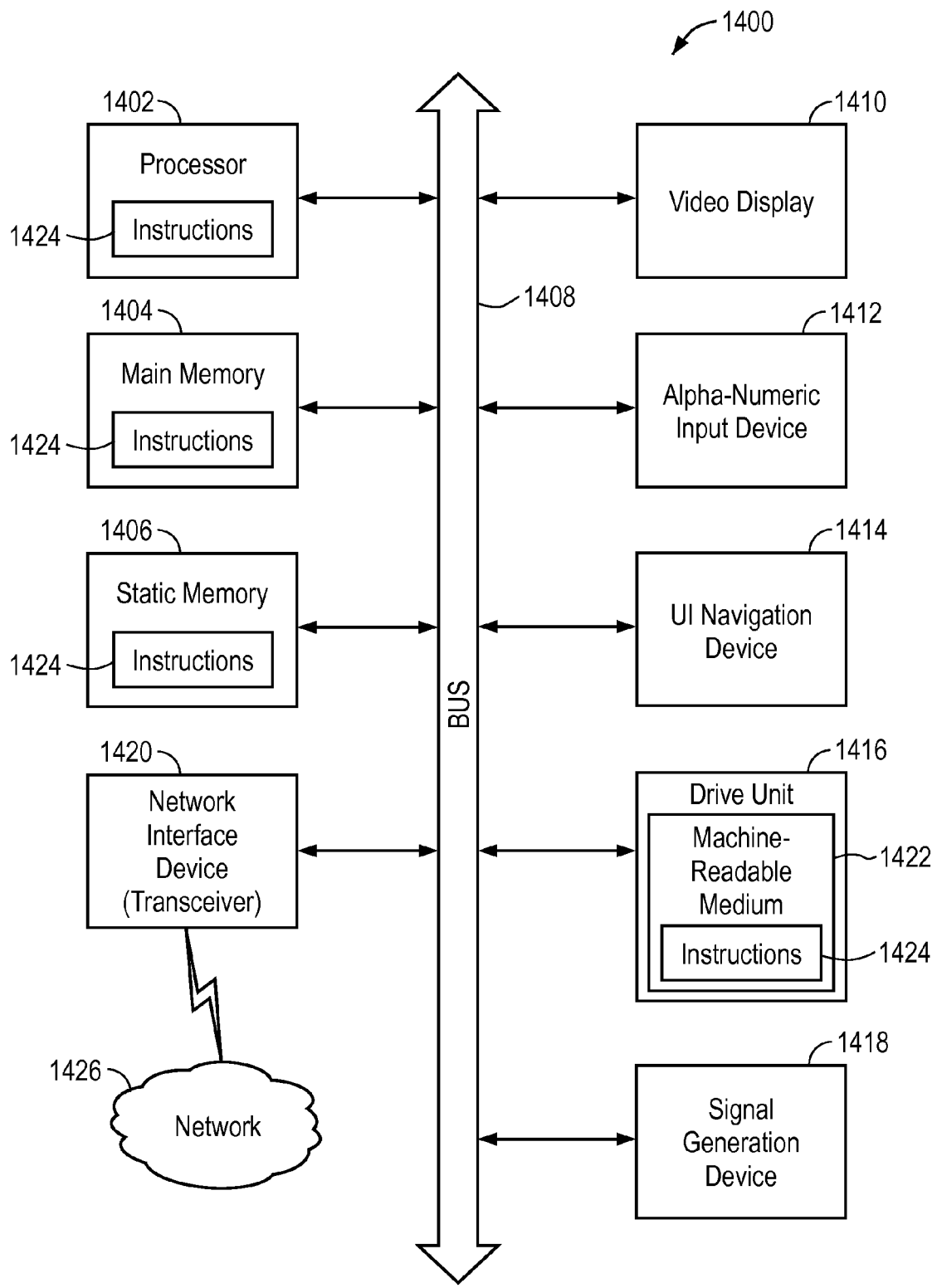
FIG. 14 is an illustrative diagrammatic representation of a machine in the example form of a computer system within which a set of instructions, for causing the machine to perform any one or more of the methodologies discussed herein, may be executed.

FIG. 14 is an illustrative diagrammatic representation of a machine in the example form of a computer system 1400 within which a set of instructions, for causing the machine to perform any one or more of the methodologies discussed herein, may be executed.

Figure 5A:
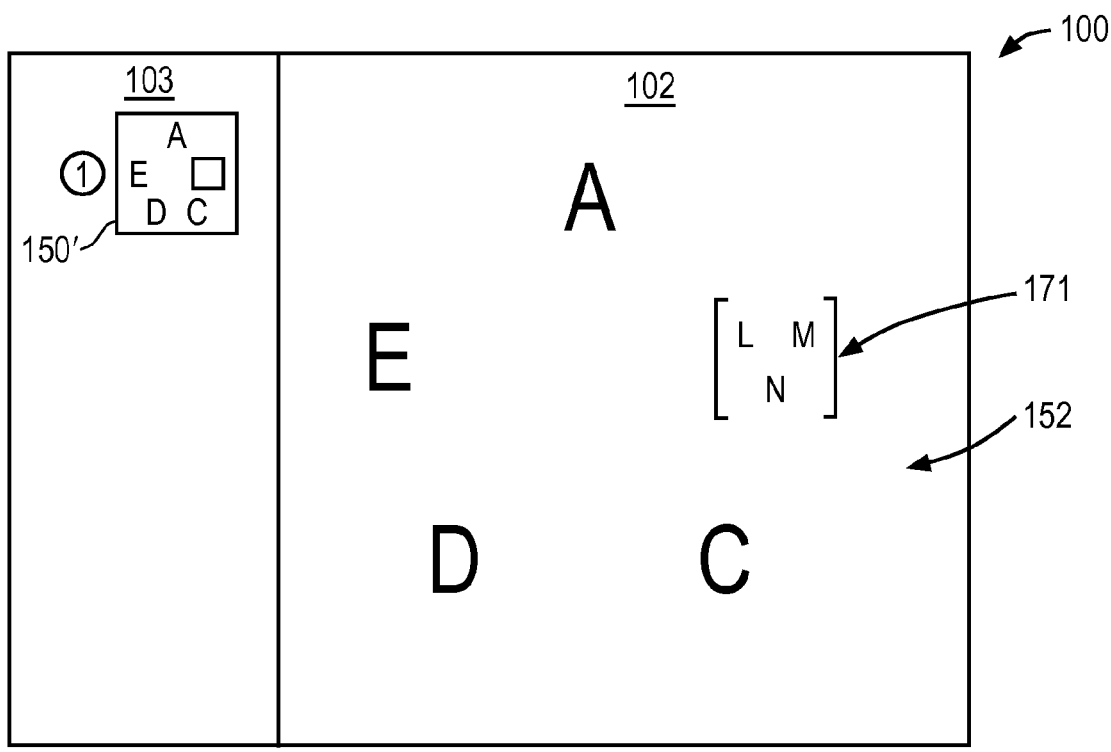
FIGS. 5A-5D are illustrative drawings representing a display screen showing an example sequence of images produced within the canvas and within the control panel in response to user actions in accordance with some embodiments.

FIGS. 5A-5D are illustrative drawings representing a display screen 400 during editing mode operation of a computer, showing an example sequence of images produced within the canvas 102 and within the control panel 103 of the user interface 100 in response to user actions creating a new presentation path segment and a new screen image within a presentation in accordance with some embodiments. A presentation is created during editing mode operation of the computer in which a user engages in actions to build and edit a presentation. FIG. 5A shows the example user interface in which the first screen image 150 is displayed in the canvas region 102 visible in the display screen 105, and in which other screen images in the presentation have not yet been created. A thumbnail slide image 150' displayed in the control region 103 that corresponds to the first screen image 150 indicates that the first screen image 150 is displayed during a pause in panning and zooming during the presentation.

Figure 5B:
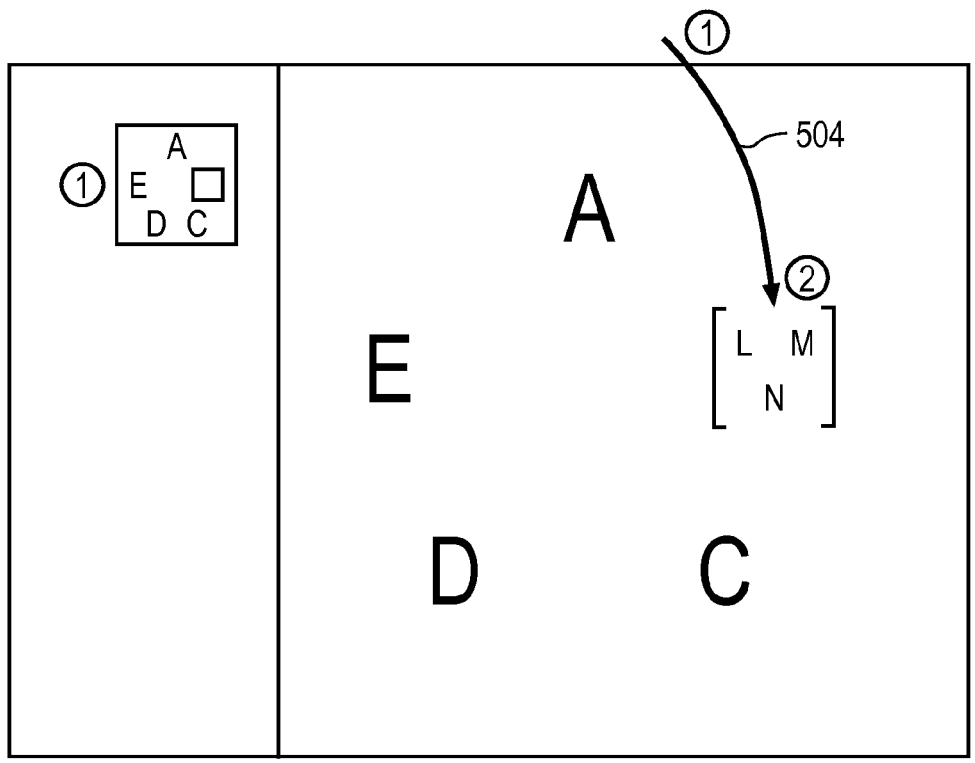

Referring to FIG. 5B, in some embodiments, during the editing mode in which the presentation is being created, a user uses an interactive pointing device (not shown) to cause arcs to be displayed on the canvases that indicate the paths followed by the presentation in the sequencing of screen images. Referring to FIG. 2, for example, a user can select on the Path icon 120 to actuate arc creation to indicate presentation path on the canvas. In the example canvas 102 of FIG. 5B, in response to the user input adding an additional path, an arc 504 is displayed extends between a region of the canvas containing the first slide 150 and a region of the canvas 102 containing display element 171. The path is labeled to show the ordering of screen images. In this example, the screen image 150 is labeled 1 and the display element is labeled 2 their relative ordering in a presentation.

Figure 5C:
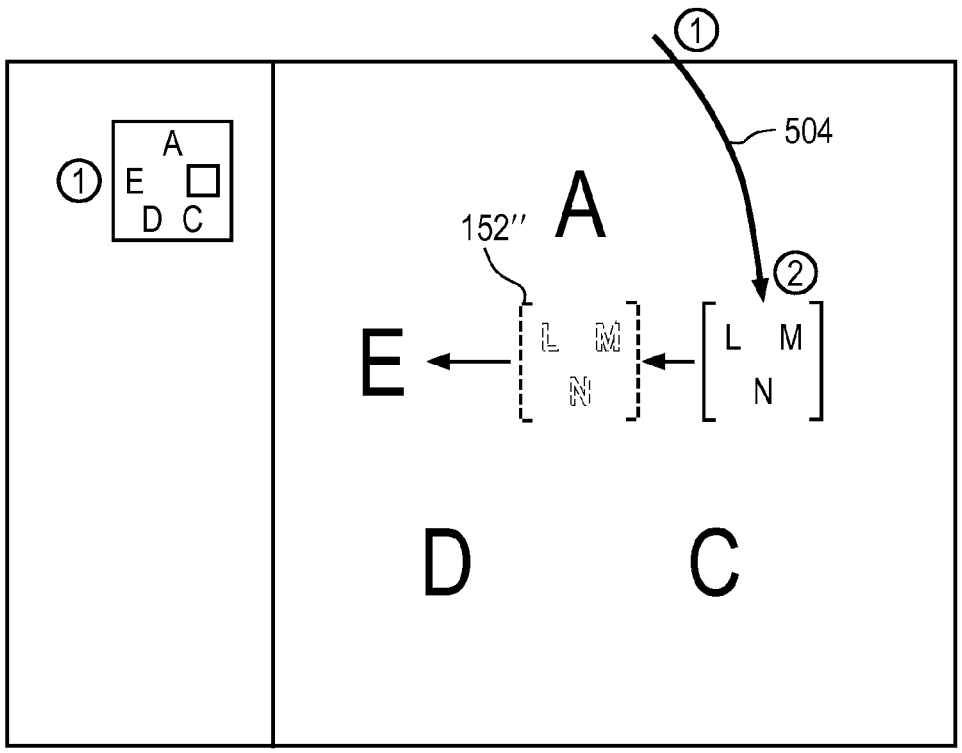

Referring to FIG. 5C, a user selects the display element and selects on the insert icon 115 of FIG. 2 to actuate an insertion of the display element 171 as the second screen image 152. Note that a presentation that transitions from the first screen image 150 to the second screen image 152 involves zooming in closer since the second screen image 152 corresponds to a display element 171 disposed within the first screen image 150. In response to creation of a path and insertion of the new screen image, the computer system generates an animation image 152" that illustrates a copy of the display element 171, which is being inserted into the presentation as a screen image 152, moving from its screen location on the canvas 102 to the side panel 103. The animation image is provided to catch the eye of the user who is creating the presentation so that the user perceives the relationship between the new screen image 152 and the new thumbnail 152'. This can be especially useful where a new screen image is added someplace in the middle of a longer list of thumbnails (not shown). For example, in some embodiments, the animation involves displaying a phantom image of a newly created screen image moving from a location within the canvas 102 of the display elements displayed within the new screen image to a location within the control region 103 of the corresponding new thumbnail image.

Figure 5D:
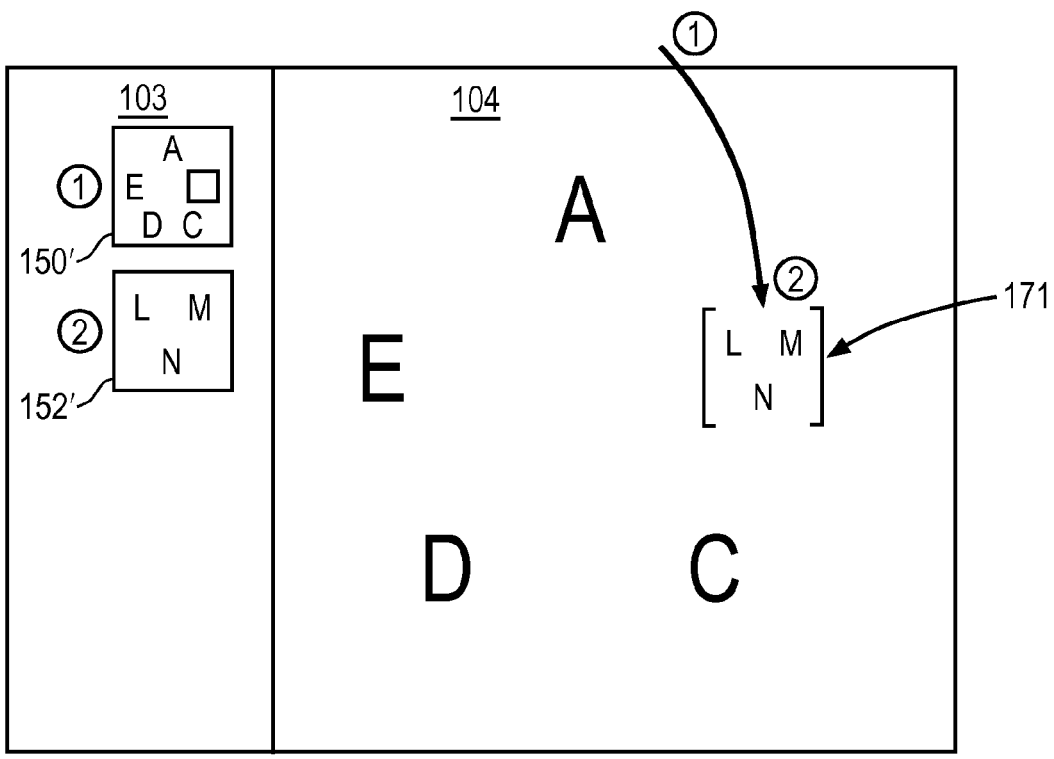

Referring to FIG. 5D, a second thumbnail image 152' representing the second screen image 152 is shown included in the control panel 103. The first and second thumbnails 150', 152' are labeled with numbers 1 and 2, respectively, which correspond to their ordering on the arc in the canvas 102 during the editing mode that indicate the order in which the screen images are to be shown during a presentation. It will be appreciated that during an actual showing of a presentation, the arcs are invisible. The arcs are for editing purposes only and could be a distraction during an actual presentation.

As mentioned above, the animation 152" helps a user to perceive the correspondence between the thumbnail images in the control panel and insertion of screen images in the presentation. It will be understood that in complex presentations, for example, a screen image may be inserted amidst many other screen images that may be at different zoom levels, and the animation assists the user in more easily perceiving where the newly created screen image fits among the other screen images in the show by showing the correspondence between the new screen image 152 and its new thumbnail image 152'.

During editing, arcs serve a role of informing a user who is creating a presentation of the order in which screen images are presented and the paths taken, that is the panning and zooming across other portions of the canvas, form one screen image to the next during a showing of the presentation. As such arcs are unnecessary during an actual showing of a presentation. Thus, it will be appreciated that in some embodiments, the arcs between display elements included within different screen images are displayed during editing mode operation but ordinarily are not presented during presentation mode operation.

Figure 6:
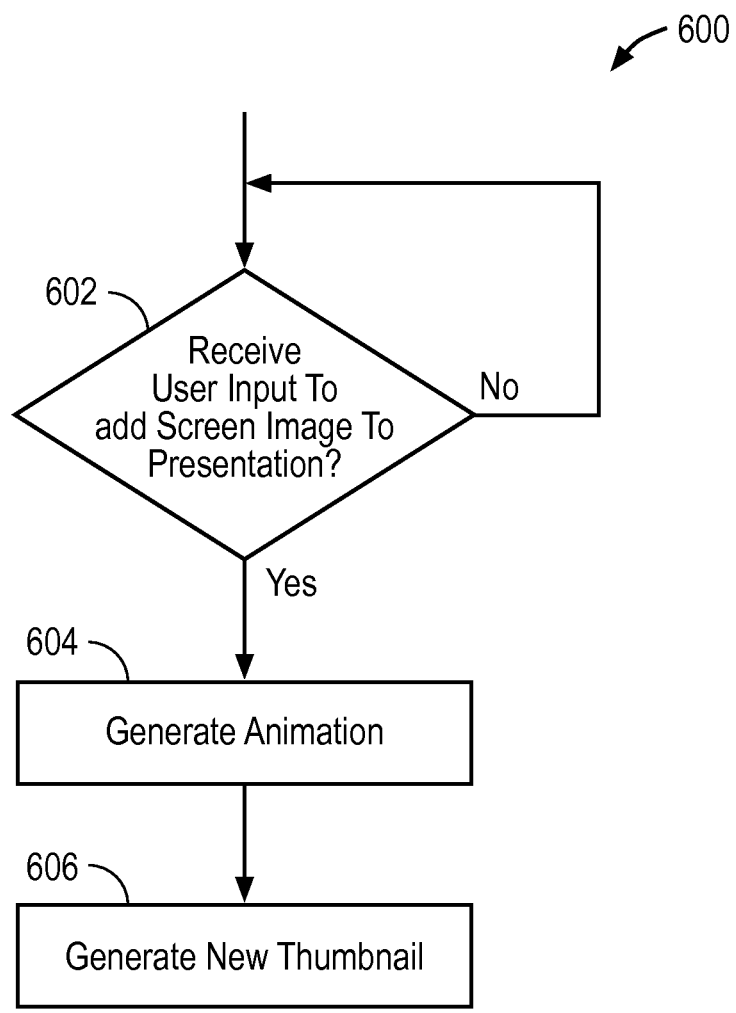
FIG. 6 is an illustrative flow diagram representing configuration of a computer to perform a process of generating an animation and a new thumbnail slide image in response to user input creating a new screen image for a presentation in accordance with some embodiments.

FIG. 6 is an illustrative flow diagram 600 representing configuration of a computer to perform a process of generating an animation and a new thumbnail image in response to user input creating a new screen image for a presentation in accordance with some embodiments. Decision module 602 monitors user input, such as through using icon 120 that selects a display element from within the canvas 102 to be used as a new screen image for inclusion in a presentation. In response to detecting user input to create a new screen image, (the 'yes' branch), module 604 generates an animation that moves across a window view of the canvas from the display element that is to be used as a new screen image to the control panel 103, and module 606 adds a thumbnail image to the control panel 103 that corresponds to the new screen image (and to the display element selected to be shown in the new screen image).

Figure 7B:
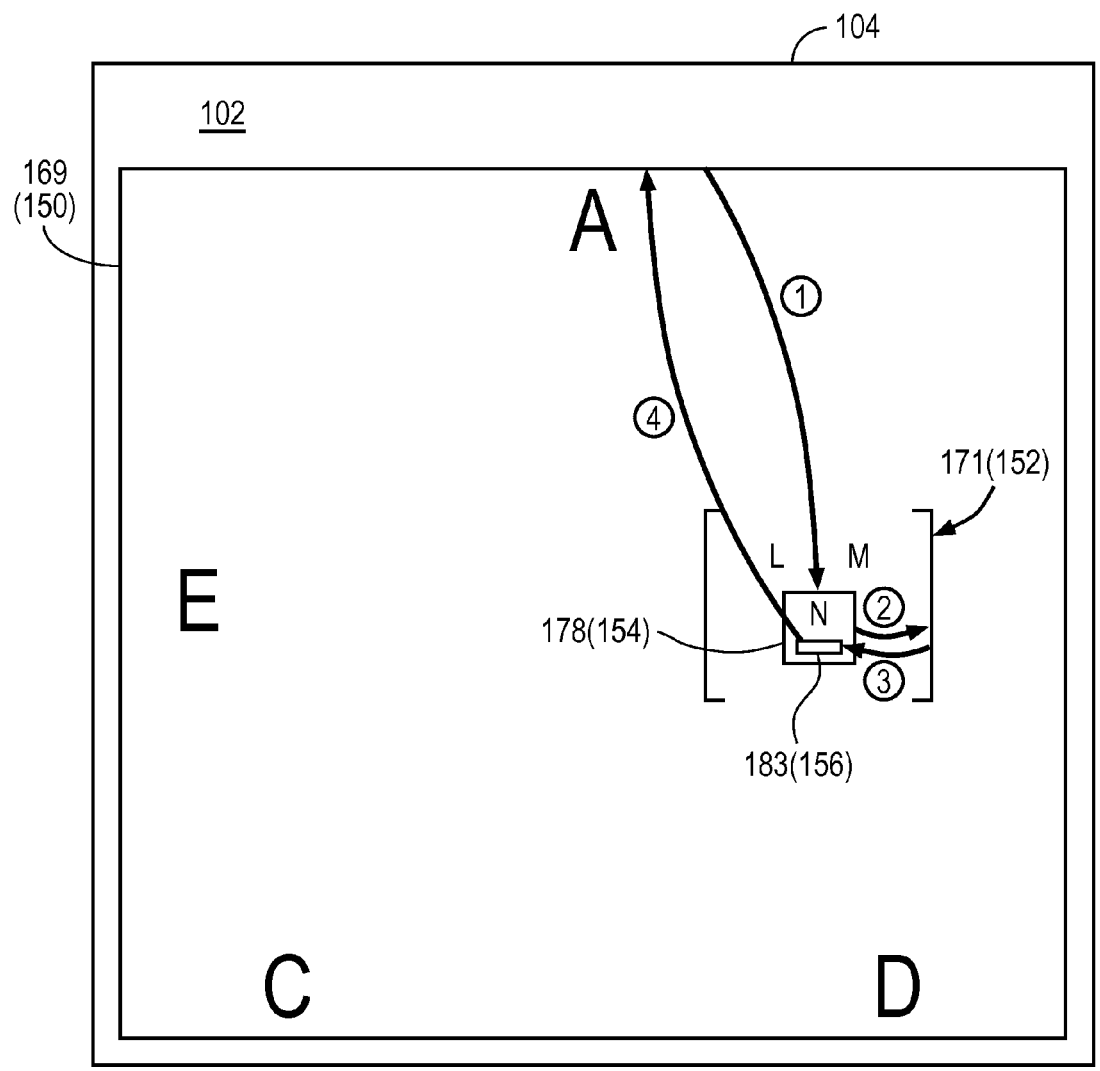
Figure 7C:
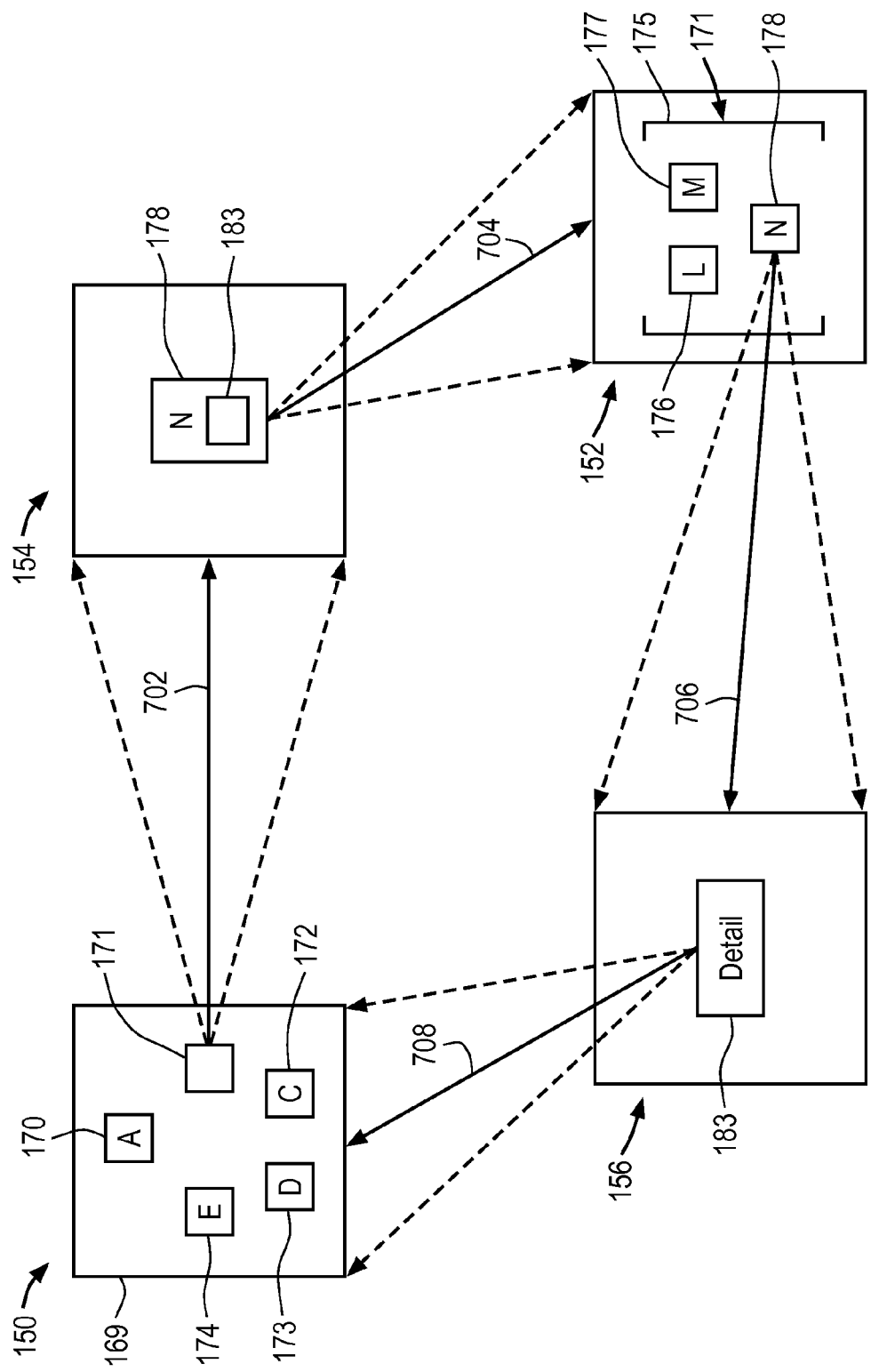

FIGS. 7A-7C are illustrative drawings showing functional relationship between changing ordering and removal of thumbnail images in the control panel region (FIG. 7A) and display of arcs during editing mode (FIG. 7B) that indicate the order of presentation of display elements as screen images later during a presentation and actual screen images displayed during presentation how mode (FIG. 7C) during a presentation following the change in thumbnail ordering in accordance with some embodiments. Referring to FIG. 7A, there are shown before 103A and after 103B views of the control panel region. As shown in the control panel view 103A, before changing thumbnail ordering, the thumbnails are ordered as shown with thumbnail 152' being the second thumbnail in order and thumbnail 154' being the third thumbnail in order. FIG. 3 illustrates the order of presentation of screen images that corresponds to the thumbnail order of the 'before' control panel view 103A of FIG. 8. In the 'after' control panel view 103B, after changing thumbnail ordering, the thumbnail 154' is the second thumbnail in order and thumbnail 152' is the third thumbnail in order.

Table 2 represents data structure information stored in a computer readable storage device corresponding to the example thumbnail image slides displayed within the 'after' panel view 103B shown in FIG. 7A in accordance with some embodiments.

TABLE 2

| Order Number | (x, y,) position | Zoom level |
| --- | --- | --- |
| 1 | $(x_1, y_1,)$ | 2 |
| 2 | $(x_3, y_3,)$ | 6 |
| 3 | $(x_2, y_2,)$ | 4 |
| 4 | $(x_4, y_4,)$ | 9 |
| 5 | $(x_1, y_1,)$ | 2 |

It will be appreciated of course that an addition of a thumbnail image (not shown) to the control panel image 103 is accompanied by a corresponding addition of information corresponding to that thumbnail image to the data structure information in storage.

Referring to FIG. 7B, there is shown an example edit screen display that may be displayed during editing after the change in thumbnail ordering to that of the control panel view 103B in accordance with some embodiments. An arc labeled 1 extends from display element 169 (screen image 150) to display element 178 (screen image 154). An arc labeled 2 extends from display element 178 to display element 171 (screen image 152). An arc labeled 3 extends from display element 171 to display element 183 (screen image 156). An arc labeled 4 extends from display element 183 to display element 169. Thus, FIG. 7B shows zooming in along the arc labeled 1, zooming out along the arc labeled 2, zooming in along the arc labeled 3 and zooming out along the arc labeled 4. It will be noted that in FIG. 6B, reference numerals of screen images corresponding to display elements are indicated in parentheses. Referring to FIG. 7C, there is shown an example sequence of screen images produced during a presentation after the change in thumbnail ordering to that of the control panel view 103B in accordance with some embodiments. The example presentation follows a sequence of path segments 702-708. Path 702 proceeds from screen image 150 to screen image 154. In traversing path 702, the presentation displays panning (not shown) across the canvass, perhaps across other display elements (not shown) displayed on the canvas and zooms in on display element 178, which is shown in screen image 154 as the presentation moves for screen image 150 to screen image 154. In traversing path 704, the presentation displays panning (not shown) across the canvass, perhaps across other display elements (not shown) displayed on the canvas and zooms out to show display element 171, which is shown in screen image 152. In traversing path 706, the presentation displays panning (not shown) across the canvass, perhaps across other display elements (not shown) displayed on the canvas and zooms back in to display element 183 in screen image 156. Finally, in traversing path 708, the presentation displays panning (not shown) across the canvass, perhaps across other display elements (not shown) displayed on the canvas and zooms out again to display element 169 in screen display 150.

In addition, removal of a thumbnail (not shown) removal of a corresponding screen image from a presentation and in an editing mode, results in adjustment of the data structure corresponding to the control panel and results in re-ordering of arcs between display elements on the canvas that correspond to screen images. For example, removal of thumbnail image slide 152' from the 'after' control panel 103B of FIG. 7A results in the control panel 103C. It will be appreciated that although the screen image is removed from the presentation, display elements within the removed screen image are not removed from the canvas; although they are no longer constitute a screen image, they remain a part of the canvas and still may be visible during a presentation during panning and zooming, for example.

Table 3 represents data structure information stored in a computer readable storage device corresponding to the example thumbnail image slides displayed within the 'after' and further 'removal' panel view 103C shown in FIG. 7A in accordance with some embodiments.

TABLE 3

| Order Number | (x, y,) position | Zoom level |
| --- | --- | --- |
| 1 | $(x_1, y_1,)$ | 2 |
| 2 | $(x_2, y_2,)$ | 4 |
| 3 | $(x_4, y_4,)$ | 9 |
| 4 | $(x_1, y_1,)$ | 2 |

Figure 8:
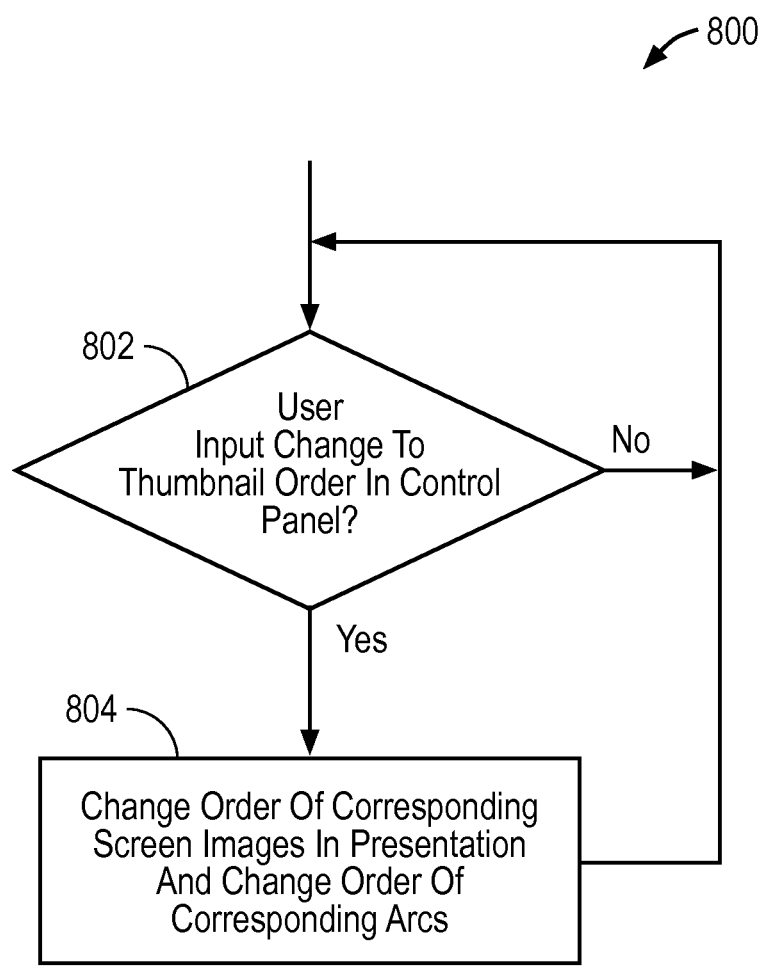
FIG. 8 is an illustrative flow diagram representing configuration of a computer to perform a process of changing order of screen image display in a presentation in response to a change in order of thumbnail slide images in the control panel in accordance with some embodiments.

FIG. 8 is an illustrative flow diagram 800 representing configuration of a computer to perform a process of changing order of screen image display in a presentation in response to a change in order of thumbnail images in the control panel in accordance with some embodiments. Decision module 802 monitors user input, such as through a pointing device that selects a thumbnail image and changes its position in the ordering of thumbnail images in the control panel. In response to detecting a change in ordering (the yes branch), module 804 makes corresponding changes in the ordering of corresponding screen images in a presentation. In an editing mode, module 804 also makes corresponding changes in the ordering of corresponding arcs between display elements visible on the canvas 102. The arcs act as indications of which display elements constitute screen images during a presentation and indicate the order of screen images during a presentation.

Figure 9:
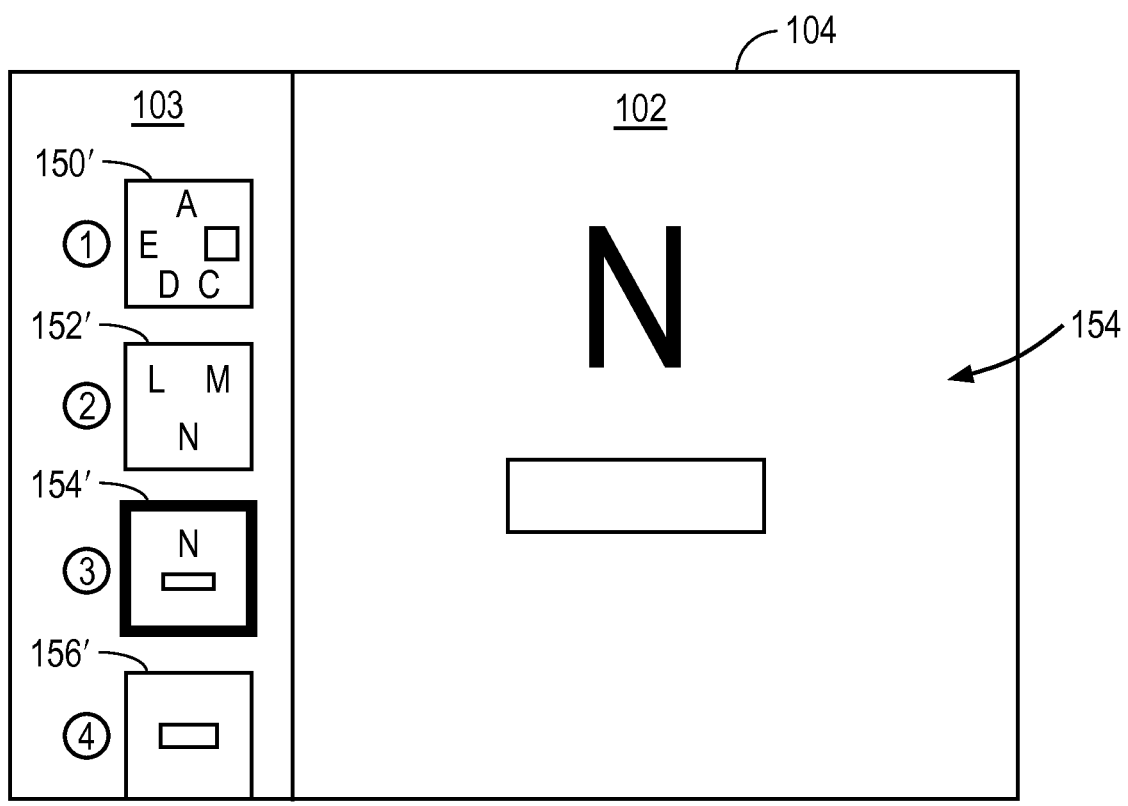
FIG. 9 is an illustrative drawing of a representing a display screen displaying a computer generated user interface that includes a zoomable canvas region and a control panel region including thumbnail slide images in accordance with some embodiments.

FIG. 9 is an illustrative drawing of a representing a display screen 104 displaying a computer generated user interface 100 that includes a zoomable canvas region 102 and a control panel region 103 including thumbnail images in accordance with some embodiments. The thumbnail images and their ordering in FIG. 9 are the same as in FIG. 4. However, in FIG. 9, thumbnail image 154' is selected in the control panel 103 and corresponding screen image 154 is displayed on the canvas 102.

Figure 10:
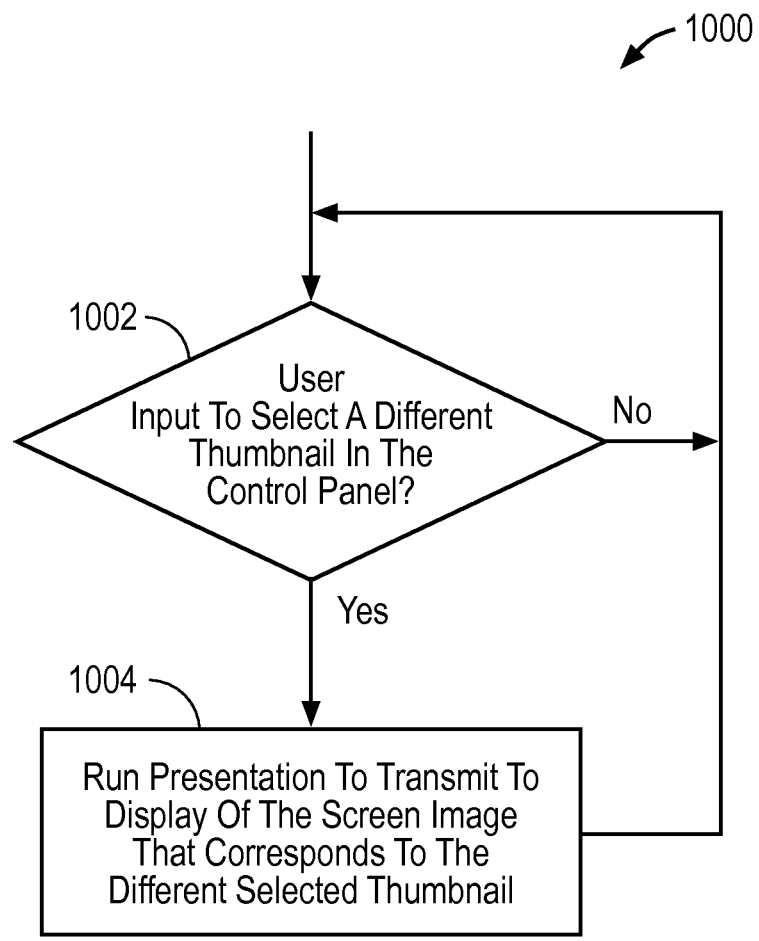
FIG. 10 is an illustrative flow diagram representing configuration of a computer to perform a process of changing a screen image in a presentation in response to a change in user selection of thumbnail slide image in the control panel in accordance with some embodiments.

FIG. 10 is an illustrative flow diagram 1000 representing configuration of a computer to perform a process of changing a screen image in a presentation in response to a change in user selection of thumbnail image in the control panel in accordance with some embodiments. Decision module 1002 monitors user input, such as through a pointing device that selects a thumbnail image. In response to detecting a change in ordering (the yes branch), module 1004 configures a computer to run the presentation starting with a screen image corresponding to a previously selected thumbnail image to a screen image corresponding to a next selected thumbnail image. Running the presentation in response to the change in thumbnail selection includes displaying whatever panning and zooming occurs during the presentation in the course of the transition from the starting screen image to the next screen image. In the example illustrated though FIGS. 4 and 9, running the presentation involves panning and zooming in from screen image 152 to the screen image 154.

Further to the process of FIG. 10, referring to FIG. 4, for example, assuming that the second thumbnail image slide 152' in order currently is highlighted as shown and a user was to select the fourth in order slide 156', then computer would be configured to traverse a path shown in FIG. 3 from screen image 152 to screen image 156, which involves zooming in on screen image 154 in the course of the traversal. Referring to Table 1, for example, the traversal from screen 152 to screen image 156 would involve a transition from zoom level 4 to zoom level 6 to zoom level 9 and would involve a transition from 2D canvas locations $(x_2, y_2)$ to $(x_3, y_3)$ to $(x_4, y_4)$.

Still further to the process of FIG. 10, referring to FIG. 4, for example, assuming that the fourth thumbnail image slide 154' currently is highlighted as shown and a user was to select the first in order slide 150', then the computer would be configured to traverse a reverse of the path and to traverse from slide 154' to slide 150', in reverse presentation order, as shown in FIG. 3 from screen image 154 to screen image 150, which would involve zooming in on screen image 152 in the course of the traversal. Referring again to Table 1, for example, the traversal from screen 154 to screen image 150 would involve a transition from zoom level 6 to zoom level 4 to zoom level 2 and would involve a transition from 2D canvas locations $(x_3, y_3)$ to $(x_2, y_2)$ to $(x_1, y_1)$.

Figure 11A:
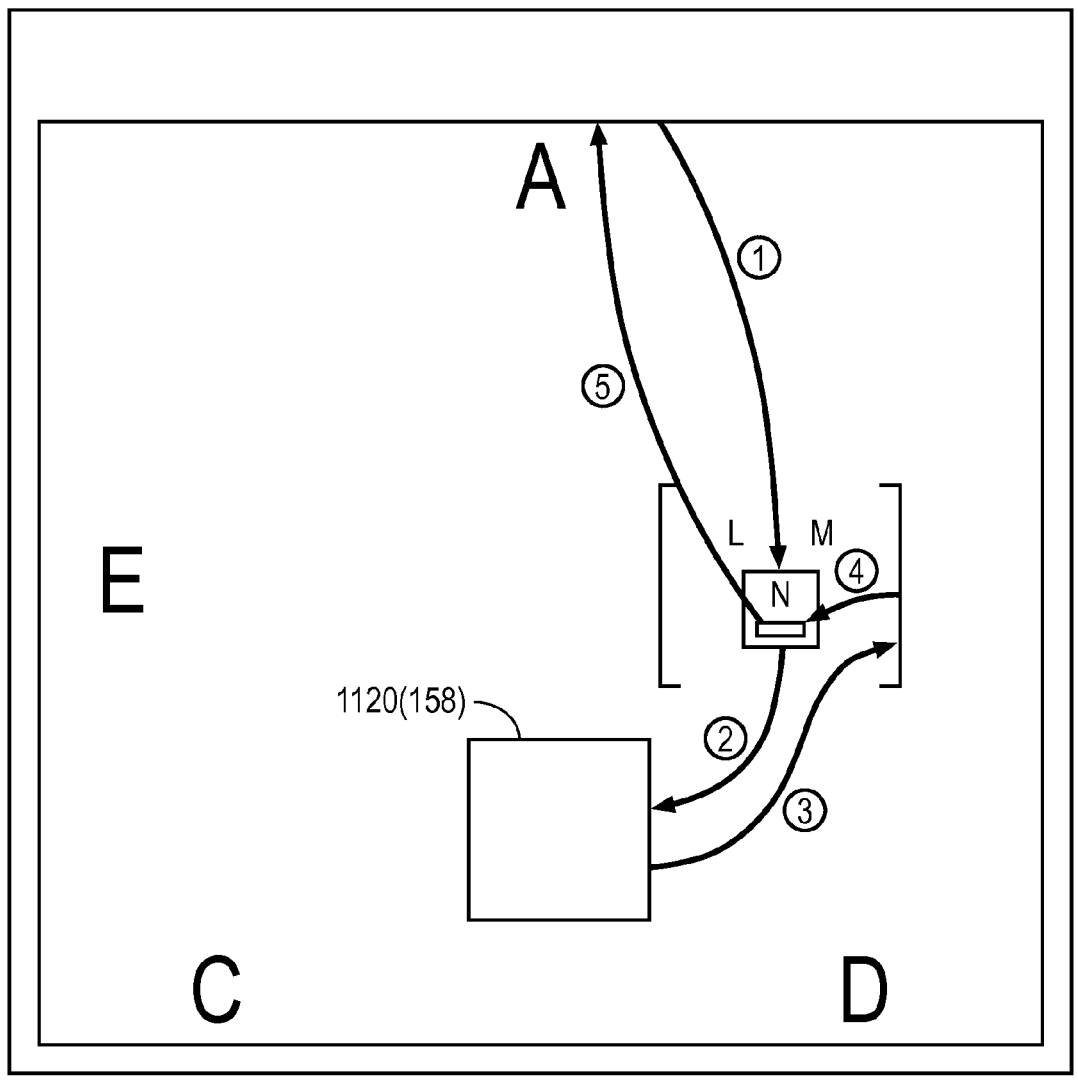
FIGS. 11A-11B are illustrative drawings showing two example edit screen display shown during editing in which a blank display element is added that is designated as a new screen image before (FIG. 11A) and after (FIG. 11B) adding display elements within the screen image in accordance with some embodiments.
Figure 11B:
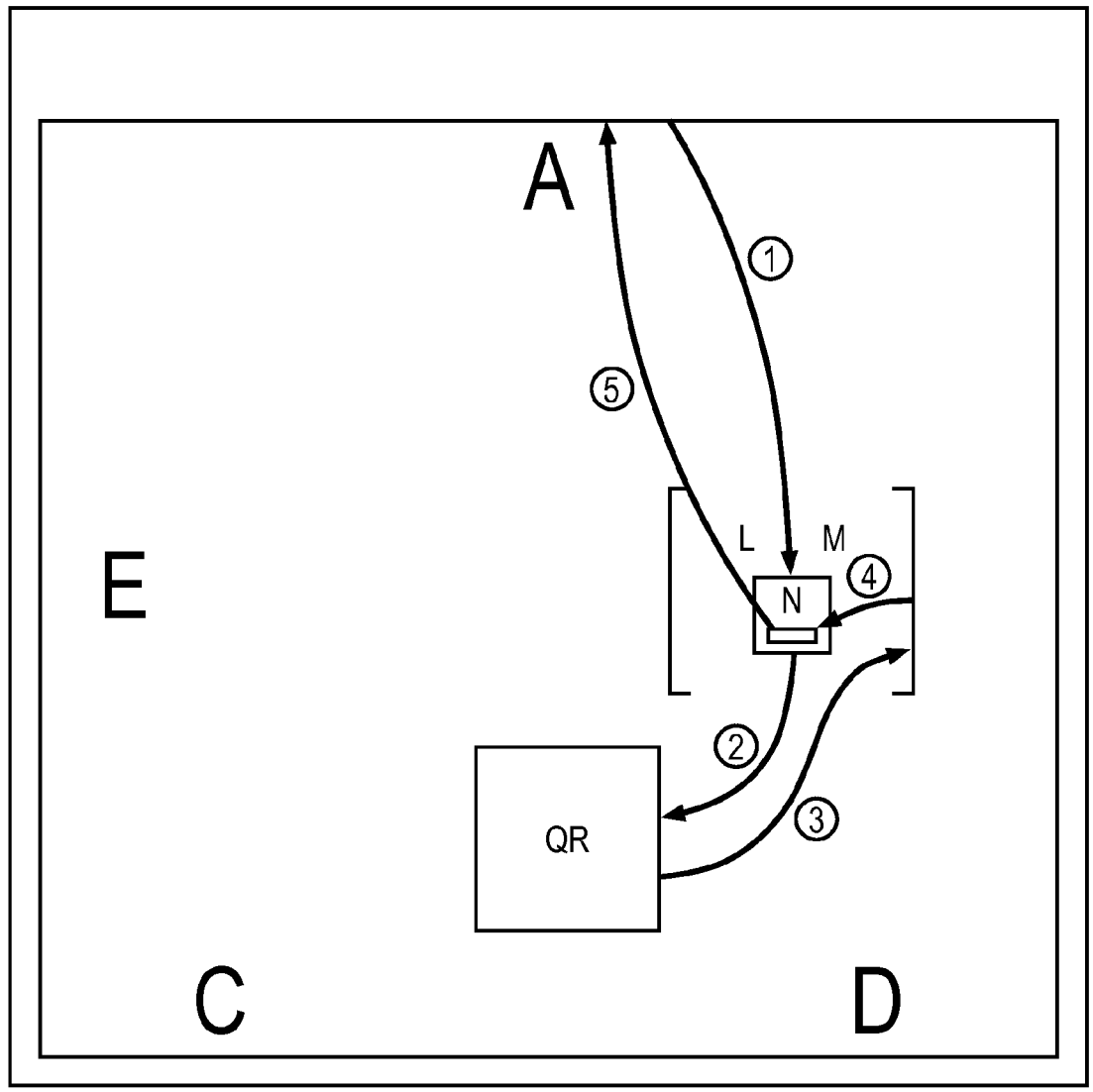
Figure 12A:
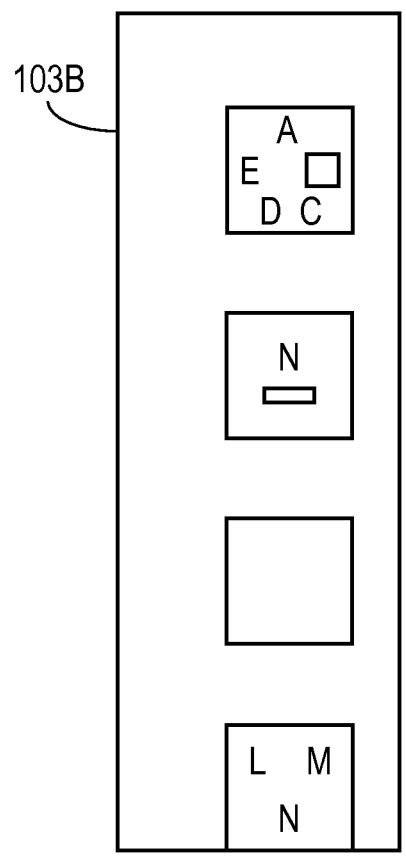
FIGS. 12A-12B are illustrative drawings showing a control panel in which a new thumbnail slide image is shown that corresponds to the new screen image before (FIG. 12A) and after (FIG. 12B) display elements are added within the corresponding new screen image in accordance with some embodiments.
Figure 12B:
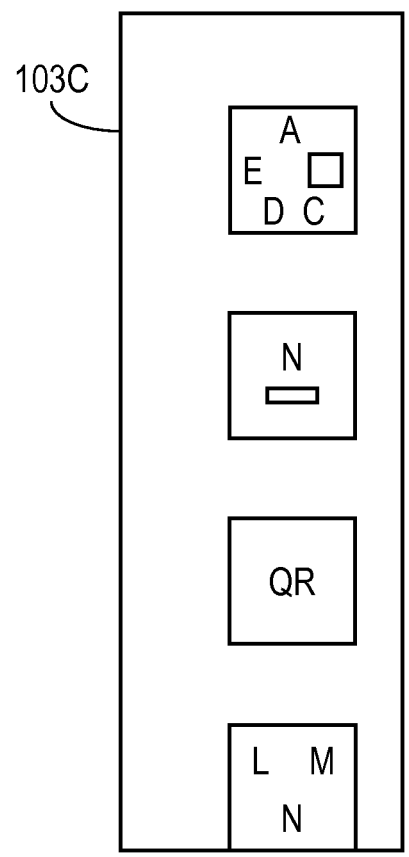

FIGS. 11A-11B are illustrative drawings showing two example edit screen display shown during editing in which a blank display element is added that is designated as a new screen image before (FIG. 11A) and after (FIG. 11B) adding display elements within the screen image in accordance with some embodiments. The new display element 1120 may be created using an insert region 115 of the control icon of FIG. 2. Alternatively, in some embodiments a insert region 115', indicated by '+' in FIG. 4, for example, is included in the control region 103 and can be selected by a user to add a new screen image and a corresponding thumbnail image slide. Once the new display element 1120 is created, it may be designated as a screen image within the presentation by selecting the path feature of the control element of FIG. 2 and creating one or more arcs on the edit screen display that connect the newly added display element 1120 with other display elements previously designated to serve as screen images in the presentation. It will be appreciated that during an editing mode, arcs indicate display elements that constitute screen images during showing of a presentation and also indicate the order of such screen images during the sowing of the presentation. FIGS. 12A-12B are illustrative drawings showing a control panel in which a new thumbnail image is shown that corresponds to the new screen image before (FIG. 12A) and after (FIG. 12B) display elements are added within the corresponding new screen image in accordance with some embodiments.

The edit screen display of FIG. 11A is created from the edit screen display of FIG. 7 through the addition of a new display element 1120. Specifically, assume for example that during editing, a user creates a new display element 1120 and designates it to be a new screen image 158 (indicated by parentheses) inserted in a presentation between screen images 154 and 156. Specifically, as shown in FIG. 11A, the insertion of the new screen image 158 results in the arc labeled 1 extends from display element 169 (screen image 150) to display element 178 (screen image 154). An arc labeled 2 extends between display element 178 and the new display element 1120 (screen image 158). An arc labeled 3 extends between display element 1120 and display element 171 (screen image 152). An arc labeled 4 extends between display element 171 and display element 183 (screen image 156). An arc labeled 5 extends between display element 183 and display element 169 (screen image 150). The edit screen image of FIG. 11B is created by adding display elements Q and R within the newly created display element 1120 of FIG. 11A.

The control panel view of FIG. 12A is created from the control panel 103B of FIG. 7A. A computer is configured to add a blank thumbnail image 158' to the control panel in response to the designation of the newly added display element 1120 in the edit display screen to serve as a screen image 156. A computer is configured to add to the thumbnail image 158' image 158" having an appearance that is the same or similar to that of display elements Q and R which are added to the newly added display element 1120. It will be noted that the newly added thumbnail image 158' is added to the list of thumbnail images in the control panel in a positional order that corresponds to the positional order of the corresponding screen image 158 relative to the other screen images in the presentation as indicated by the arcs labeled 1-5 in FIGS. 11A-11B.

It will be appreciated that in some embodiments, a computer is configured in accordance with the process 600 described with reference to FIG. 6 to add the new blank thumbnail 158' as shown in FIG. 12B in response to designation of the new display element 1120 as a screen image 158. For example, addition of the new thumbnail 158' may involve animation as described above.

Figure 13:
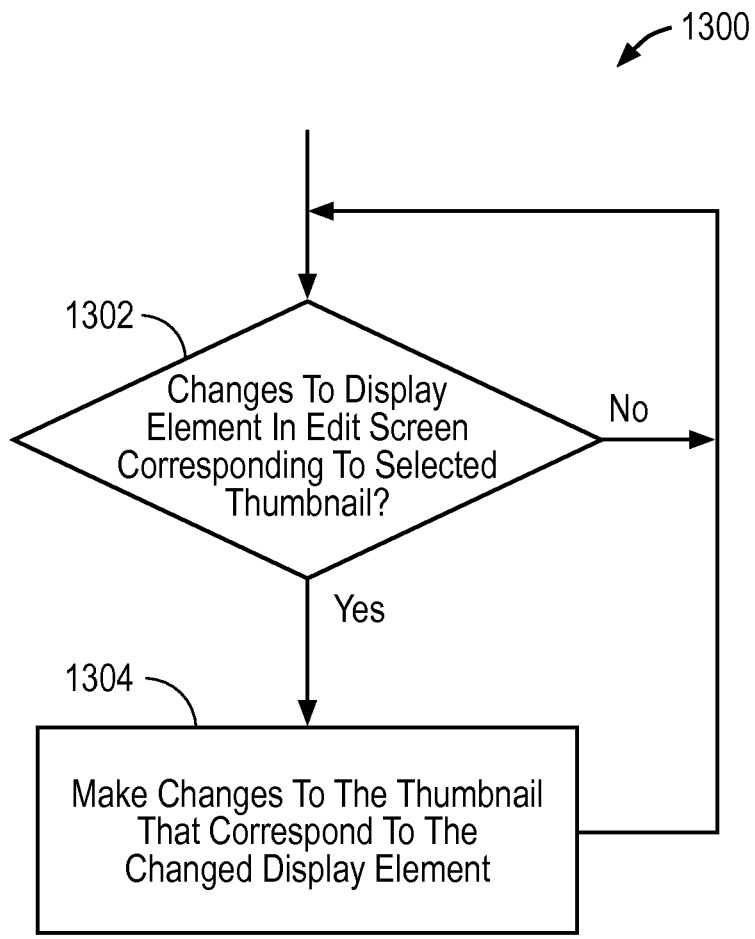
FIG. 13 is an illustrative flow diagram representing configuration of a computer to change the appearance of a thumbnail slide image in response to changes in a corresponding display element in an edit display screen in accordance with some embodiments.

FIG. 13 is an illustrative flow diagram representing configuration of a computer to change the appearance of a thumbnail in response to changes in a corresponding display element in an edit display screen in accordance with some embodiments. As shown in FIG. 12B, for example, changes in the display element 1120 (screen image 158) result in corresponding changes in thumbnail 158'. Referring to FIG. 13, decision module 1302 determines whether changes are made to a display element that corresponds to a thumbnail image. If so (the 'yes' branch), then module 1304 module 1304 configures the computer to make corresponding changes to the thumbnail image. Thus, for example, referring to FIGS. 11B and 12B, addition of display elements Q and R to display element 1120 (screen image 158) causes configuring of the computer to add corresponding Q and R images to the corresponding thumbnail image 158'.

Hardware Environment

FIG. 14 is an illustrative diagrammatic representation of a machine in the example form of a computer system 1400 within which a set of instructions, for causing the machine to perform any one or more of the methodologies discussed herein, may be executed. The computer system 1400 can comprise, for example, can be configured to implement a static analysis tool including derivers, for example. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1400 includes a processor 1402 (e.g., a central processing unit (CPU), a graphics processing unit (GPU), or both), a main memory 1404 and a static memory 1406, which communicate with each other via a bus 1408. The computer system 1400 may further include a video display unit 1410 (e.g., liquid crystal display (LCD), organic light emitting diode (OLED) display, touch screen, or a cathode ray tube (CRT)) that can be used to display a user interface that includes a control panel region and canvas, for example. The computer system 1400 also includes an alphanumeric input device 1412 (e.g., a keyboard, a physical keyboard, a virtual keyboard using software), a cursor control device or input sensor 1414 (e.g., a mouse, a trackpad, a trackball, a sensor or reader, a machine readable information reader, bar code reader), a disk drive unit 1416, a signal generation device 1418 (e.g., a speaker) and a network interface device or transceiver 1420.

The disk drive unit 1416 includes a non-transitory machine-readable storage device medium 1422 on which is stored one or more sets of instructions (e.g., software 1424) embodying any one or more of the methodologies or functions described herein, such as the processes of FIGS. 6, 8 and 10. The software 1424 may also reside, completely or at least partially, within the main memory 1404 and/or within the processor 1402 during execution thereof by the computer system 1400, the main memory 1404 and the processor 1402 also constituting non-transitory machine-readable storage device media. The non-transitory machine-readable storage device medium 1422 also can store an integrated circuit design and waveform structures.

The 1424 may further be transmitted or received over a network 1426 via the network interface device 920.

While the machine-readable medium 1422 is shown in an example embodiment to be a single medium, the term "machine-readable medium," "computer readable medium," and the like should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure. The term "machine-readable medium" shall accordingly be taken to include, but not be limited to, solid-state memories, optical and magnetic media, and carrier wave signals.

It will be appreciated that, for clarity purposes, the above description describes some embodiments with reference to different functional units or processors. However, it will be apparent that any suitable distribution of functionality between different functional units, processors or domains may be used without detracting from the present disclosure. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Certain embodiments described herein may be implemented as logic or a number of modules, engines, components, or mechanisms. A module, engine, logic, component, or mechanism (collectively referred to as a "module") may be a tangible unit capable of performing certain operations and configured or arranged in a certain manner. In certain example embodiments, one or more computer systems (e.g., a standalone, client, or server computer system) or one or more components of a computer system (e.g., a processor or a group of processors) may be configured by software (e.g., an application or application portion) or firmware (note that software and firmware can generally be used interchangeably herein as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor, application specific integrated circuit (ASIC), or array) to perform certain operations. A module may also comprise programmable logic or circuitry (e.g., as encompassed within a general-purpose processor or other programmable processor) that is temporarily configured by software or firmware to perform certain operations. It will be appreciated that a decision to implement a module mechanically, in dedicated and permanently configured circuitry, or in temporarily configured circuitry (e.g., configured by software) may be driven by, for example, cost, time, energy-usage, and package size considerations.

Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices and can operate on a resource (e.g., a collection of information).

Although the present disclosure has been described in connection with some embodiments, it is not intended to be limited to the specific form set forth herein. One skilled in the art would recognize that various features of the described embodiments may be combined in accordance with the present disclosure. Moreover, it will be appreciated that various modifications and alterations may be made by those skilled in the art without departing from the spirit and scope of the present disclosure.

In addition, in the foregoing detailed description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the detailed description, with each claim standing on its own as a separate embodiment.

The foregoing description and drawings of embodiments in accordance with the present invention are merely illustrative of the principles of the invention. Therefore, it will be understood that various modifications can be made to the embodiments by those skilled in the art without departing from the spirit and scope of the invention, which is defined in the appended claims.

What is claimed is:

1. A method to control a computer generated presentation on a display screen, wherein the presentation includes displaying multiple screen images in a presentation order at one or more different locations and at one or more different zoom levels on a canvas within a zooming user interface and wherein the presentation includes displaying panning and zooming between the screen images, the method comprising:

displaying on the display screen at least a portion of the presentation;

in response to user input adding an indication of a new screen image to the displayed portion of the presentation, displaying on the display screen a new thumbnail image that corresponds to the new screen image and displaying on the display screen an animation that moves in between the new screen image and the new thumbnail image to indicate on the display screen a correspondence between the new thumbnail image and the new screen image.

2. The method of claim 1 further including:

providing on the display screen multiple respective thumbnail images that correspond to the multiple screen images displayed within the presentation;

wherein providing on the display screen the multiple respective thumbnail images includes providing the thumbnail images in a presentation order of the corresponding multiple screen images; and wherein displaying the new thumbnail image includes displaying the new thumbnail image in the presentation order of the corresponding new screen image.

3. The method of claim 1, wherein displaying on the display screen at least a portion of the presentation includes during editing mode operation, displaying an arc that indicates screen images by extending between display elements on the canvas that are within different screen images in the presentation.

4. The method of claim 1, wherein adding the indication includes adding an arc between at least one display element in the displayed portion of the presentation and at least one other display element of the displayed portion of the presentation.

5. A method to control a computer generated presentation on a display screen, wherein the presentation includes displaying multiple screen images in a presentation order at one or more different locations and at one or more different zoom levels on a canvas within a zooming user interface and wherein the presentation includes displaying panning and zooming between the screen images, the method comprising:

providing on the display screen multiple respective thumbnail images that correspond to the multiple screen images displayed within the presentation;

displaying on the display screen at least a portion of the presentation;

in response to user input adding a new thumbnail image to the displayed portion of the presentation, adding an indication on the display screen a new screen image that corresponds to the new thumbnail image and displaying on the display screen an animation that moves in between the new screen image and the new thumbnail image to indicate on the display screen a correspondence between the new thumbnail image and the new screen image.

6. The method of claim 5, wherein adding the indication includes adding an arc between at least one display element in the displayed portion of the presentation and at least one other display element of the displayed portion of the presentation.

7. A system comprising:

a storage device that stores information representative of a presentation for display on a display screen, wherein the presentation includes multiple screen images in a presentation order at one or more different locations and at one or more different zoom levels on a canvas within a zooming user interface and wherein the presentation includes displaying panning and zooming between the screen images; and a computing device in communication with the storage device, the computing device configured to perform a comprising:

displaying on the display screen at least a portion of the presentation;

in response to user input adding an indication of a new screen image to the displayed portion of the presentation, displaying on the display screen a new thumbnail image that corresponds to the new screen image and displaying on the display screen an animation that moves in between the new screen image and the new thumbnail image to indicate on the display screen a correspondence between the new thumbnail image and the new screen image.

8. A system comprising:

a storage device that stores information representative of a presentation for display on a display screen, wherein the presentation includes multiple screen images in a presentation order at one or more different locations and at one or more different zoom levels on a canvas within a zooming user interface and wherein the presentation includes displaying panning and zooming between the screen images; and a computing device in communication with the storage device, the computing device configured to perform a comprising:

providing on the display screen multiple respective thumbnail images that correspond to the multiple screen images displayed within the presentation;

displaying on the display screen at least a portion of the presentation;

in response to user input adding a new thumbnail image to the displayed portion of the presentation, adding an indication on the display screen a new screen image that corresponds to the new thumbnail image and displaying on the display screen an animation that moves in between the new screen image and the new thumbnail image to indicate on the display screen a correspondence between the new thumbnail image and the new screen image.

9. The method of claim 1, wherein displaying on the display screen an animation includes showing a copy of the new screen image moving between its screen location on the canvas and the new thumbnail image.

10. The method of claim 1, wherein displaying on the display screen an animation includes showing a phantom image of the new screen image moving between its screen location on the canvas and the new thumbnail image.

11. The method of claim 1, wherein displaying on the display screen at least a portion of the presentation includes displaying the at least a portion of the presentation in a zoomable canvas region of the display screen;

wherein displaying on the display screen a new thumbnail image that corresponds to the new screen image includes displaying the in a control region of the display screen; and wherein displaying on the display screen an animation includes showing a copy of the new screen image moving between its screen location within the zoomable canvas region and the new thumbnail image within the control region.

12. The method of claim 11, wherein the control region is disposed within a side panel displayed on the display screen.

13. The method of claim 1 further including:

providing on the display screen multiple respective thumbnail images that correspond to the multiple screen images displayed within the presentation;

wherein providing on the display screen the multiple respective thumbnail images includes providing the thumbnail images in a presentation order of the corresponding multiple screen images;

wherein displaying on the display screen at least a portion of the presentation includes during editing mode operation, displaying multiple arcs that indicate extending between display elements on the canvas that indicate order of screen images in the presentation;

in response to user input changing the order of the thumbnail images, changing the display of the multiple arcs to indicate a changed order of screen images in the presentation that corresponds to the changed order of the thumbnail images.

14. The method of claim 5, wherein displaying on the display screen an animation includes showing a copy of the new screen image moving between its screen location on the canvas and the new thumbnail image.

15. The method of claim 5, wherein displaying on the display screen an animation includes showing a phantom image of the new screen image moving between its screen location on the canvas and the new thumbnail image.

16. The method of claim 5, wherein displaying on the display screen at least a portion of the presentation includes displaying the at least a portion of the presentation in a zoomable canvas region of the display screen;
    wherein displaying on the display screen a new thumbnail image that corresponds to the new screen image includes displaying the in a control region of the display screen; and
    wherein displaying on the display screen an animation includes showing a copy of the new screen image moving between its screen location within the zoomable canvas region and the new thumbnail image within the control region.

17. The method of claim 16, wherein the control region is disposed within a side panel displayed on the display screen.

18. The method of claim 5 further including:
    providing on the display screen multiple respective thumbnail images that correspond to the multiple screen images displayed within the presentation;
    wherein providing on the display screen the multiple respective thumbnail images includes providing the thumbnail images in a presentation order of the corresponding multiple screen images;
    wherein displaying on the display screen at least a portion of the presentation includes during editing mode operation, displaying multiple arcs that indicate extending between display elements on the canvas that indicate order of screen images in the presentation;
    in response to user input changing the order of the thumbnail images, changing the display of the multiple arcs to indicate a changed order of screen images in the presentation that corresponds to the changed order of the thumbnail images.

19. The system of claim 7, wherein displaying on the display screen an animation includes showing a copy of the new screen image moving between its screen location on the canvas and the new thumbnail image.

20. The system of claim 7, wherein displaying on the display screen an animation includes showing a phantom image of the new screen image moving between its screen location on the canvas and the new thumbnail image.

21. The system of claim 7, wherein displaying on the display screen at least a portion of the presentation includes displaying the at least a portion of the presentation in a zoomable canvas region of the display screen;
    wherein displaying on the display screen a new thumbnail image that corresponds to the new screen image includes displaying the in a control region of the display screen; and
    wherein displaying on the display screen an animation includes showing a copy of the new screen image moving between its screen location within the zoomable canvas region and the new thumbnail image within the control region.

22. The system of claim 21, wherein the control region is disposed within a side panel displayed on the display screen.

23. The system of claim 7 further including:
    providing on the display screen multiple respective thumbnail images that correspond to the multiple screen images displayed within the presentation;
    wherein providing on the display screen the multiple respective thumbnail images includes providing the thumbnail images in a presentation order of the corresponding multiple screen images;
    wherein displaying on the display screen at least a portion of the presentation includes during editing mode operation, displaying multiple arcs that indicate extending between display elements on the canvas that indicate order of screen images in the presentation;
    in response to user input changing the order of the thumbnail images, changing the display of the multiple arcs to indicate a changed order of screen images in the presentation that corresponds to the changed order of the thumbnail images.

24. The system of claim 8, wherein displaying on the display screen an animation includes showing a copy of the new screen image moving between its screen location on the canvas and the new thumbnail image.

25. The system of claim 8, wherein displaying on the display screen an animation includes showing a phantom image of the new screen image moving between its screen location on the canvas and the new thumbnail image.

26. The system of claim 8, wherein displaying on the display screen at least a portion of the presentation includes displaying the at least a portion of the presentation in a zoomable canvas region of the display screen;
    wherein displaying on the display screen a new thumbnail image that corresponds to the new screen image includes displaying the in a control region of the display screen; and
    wherein displaying on the display screen an animation includes showing a copy of the new screen image moving between its screen location within the zoomable canvas region and the new thumbnail image within the control region.

27. The system of claim 26, wherein the control region is disposed within a side panel displayed on the display screen.

28. The system of claim 8, providing on the display screen multiple respective thumbnail images that correspond to the multiple screen images displayed within the presentation;
    wherein providing on the display screen the multiple respective thumbnail images includes providing the thumbnail images in a presentation order of the corresponding multiple screen images;
    wherein displaying on the display screen at least a portion of the presentation includes during editing mode operation, displaying multiple arcs that indicate extending between display elements on the canvas that indicate order of screen images in the presentation;
    in response to user input changing the order of the thumbnail images, changing the display of the multiple arcs to indicate a changed order of screen images in the presentation that corresponds to the changed order of the thumbnail images.

* * * * *